E. PIERCE.
Bomb Lance.
No. 9,356. Reissued Aug. 24, 1880.
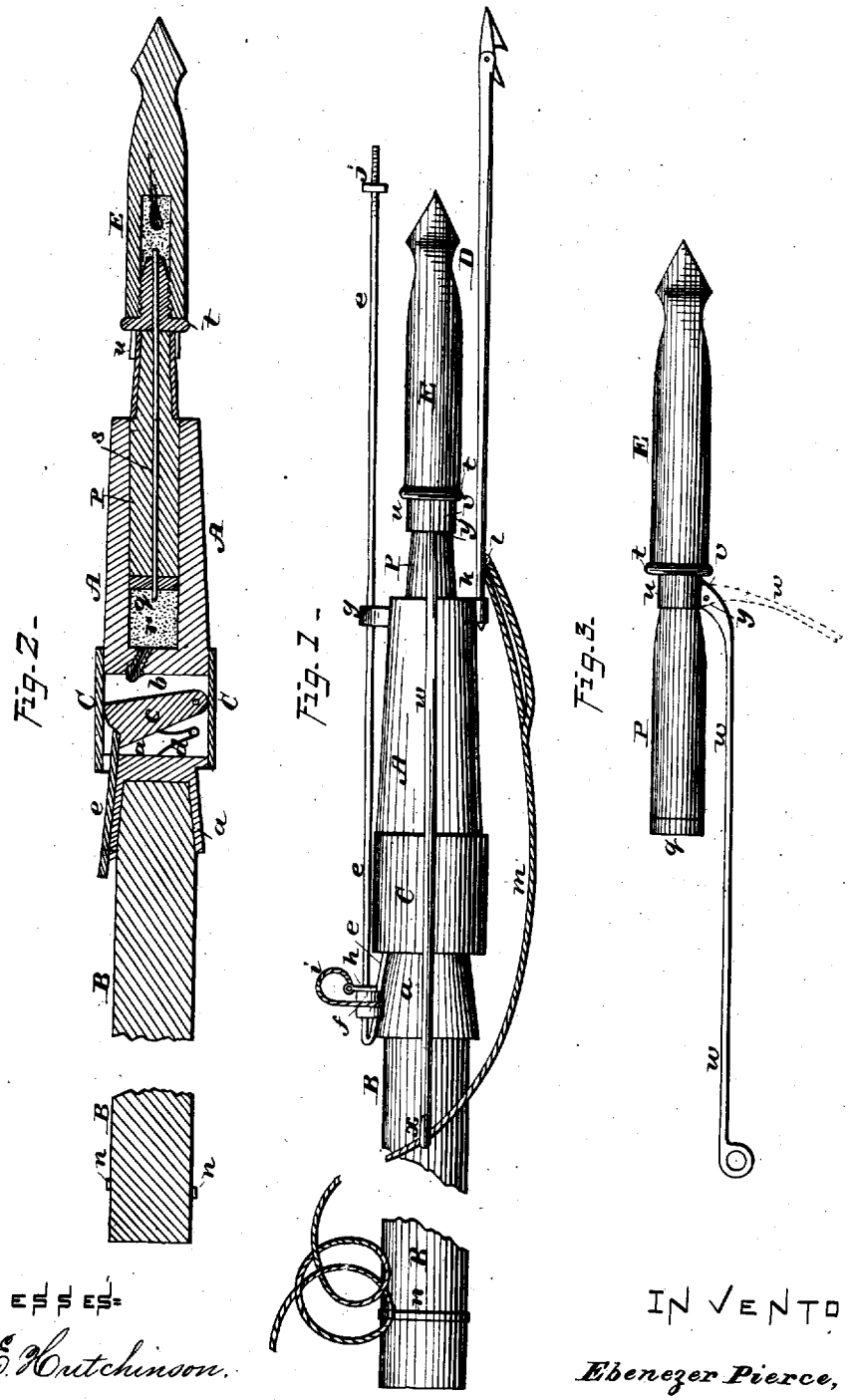
WITNESSES:
Jas. E. Hutchinson.
Albert H. Norris.
INVENTOR.
Ebenezer Pierce,
by James L. Norris,
Att'y.
N. PETERS, PHOTO-LITHOGRAPHER, WASHINGTON, D. C.

UNITED STATES PATENT OFFICE.

EBENEZER PIERCE, OF NEW BEDFORD, MASSACHUSETTS.

BOMB-LANCE.

SPECIFICATION forming part of Reissued Letters Patent No. 9,356, dated August 24, 1880.

Original No. 49,548, dated August 22, 1865. Application for reissue filed July 21, 1880.

*To all whom it may concern:*

Be it known that I, EBENEZER PIERCE, a citizen of the United States, formerly residing at Hallowell, Maine, but now a resident of New Bedford, in the county of Bristol and State of Massachusetts, have invented certain new and useful Improvements in Combined Bomb-Gun and Harpoon, of which the following is a specification.

In the accompanying drawings, Figure 1 is a side elevation of my improved bomb-gun, the various parts being represented in the position they occupy when ready for use. Fig. 2 is a vertical longitudinal section of the same. Fig. 3 is a side elevation of the bomb-lance detached from the bomb-gun.

Similar letters indicate like parts in each figure.

This invention has for its object the production of a combined bomb-gun and harpoon consisting of a gun proper mounted upon a suitable shaft and adapted to be thrown or projected at a whale, and to carry a bomb, said gun being provided with suitable mechanism adapted to be automatically operated by impact against the body of a whale, to release the hammer and fire the charge in the gun, whereby the charge in the bomb is ignited and the bomb projected into the body of the whale.

To this end my invention consists, first, in providing a bomb-gun with a lock-case containing a hammer and operating-spring, with which is combined a sliding rod arranged to move in guides on side of the gun, adapted to engage with the hammer so as to hold the hammer in a cocked position and to release the same when shifted by impact against the body of the animal.

It further consists in providing a bomb-gun with a lock-case containing a hammer and its operating-spring, with which is combined a bomb-lance and a sliding rod arranged to move in guides on side of the gun, adapted to engage with a hammer.

It further consists in providing a bomb-gun with a lock containing a hammer and its operating-spring, with which is combined a bomb-lance and a rod of greater length than the lance, said rod arranged to slide in guides on side of the gun, adapted to engage with the hammer, so as to hold the hammer in a cocked position and to release the same when shifted by impact against the body of the animal.

It further consists in the combination, with a bomb-gun, of a socket for holding and supporting in working position a harpoon, a lock-case having a hammer and operating-spring, with a rod carried by the gun, said rod adapted to slide in guides on side of the gun, for engaging with the hammer to hold it in a cocked position and to release it when shifted by impact against the body of the animal.

In the accompanying drawings, A represents my improved bomb-gun and harpoon, the rear end of which terminates in a conical socket, *a*, into which is fitted the staff or handle B.

A vertical slot, *b*, is cut through the breech of the gun for the reception of the hammer *c*, which is pivoted therein and is retained in its firing position against the resistance of the mainspring *d* by a sliding rod, *e*, which passes through a hole in the back of the breech-plate.

C is a sleeve, of metal or other suitable material, which slides over the opening formed by the slot *b* and fits the breech so snugly as to render it impossible for the water to enter.

The rod *e* moves freely back and forth in guides *f g*, projecting from the side of the front and the rear of the gun, and a similar pin, *h*, attached to a cord, *i*, passes through the rod *e* and bears against the front of the guide *f*, thus preventing the hammer *c* from being accidentally released. The forward end of the rod *e* is provided with a screw-thread, on which turns a button, *j*, which, on coming in contact with the whale, forces the rod *e* back, the pin *h* being previously withdrawn from it to allow of this movement.

D is a harpoon of the required pattern, its inner end fitting into a socket-piece, *k*, projecting from the side of the gun A, and this harpoon is provided with an eye, *l*, through which is rove one end of the line *m*, the other end of which may be secured to a boat. A few fathoms of the line *m* is left slack, as seen in Fig. 1, and is stopped by a spun yarn, *n*, near the upper end of the staff B, whereby the liability of the harpoon being retarded in its flight to the whale is avoided, the yarn *n* being broken when the slack portion is taken up.

E is a bomb-lance, which is bored out, as shown in Fig. 2, so as to form a cavity for the reception of a charge, *o*, of powder, and has a screw-thread cut within it to receive a corresponding screw-thread on the iron point of the staff *p*. This staff *p* is made of wood or other suitable material, and its rear end is covered with a metal cap, *q*, to prevent its being shattered by the explosion of the charge, *r*, contained in the gun A. Through the whole length, and passing through the center of the staff *p*, is laid a fuse, *s*, which is ignited by the explosion of the charge, *r*, in the gun A, and this fuse is so timed as to burn down to and ignite the charge, *o*, in the bomb and cause it to explode with violence within the whale at the desired moment.

On the point of the staff *p* is formed the shoulder *t*, against which, and surrounding the staff *p*, is fitted the strap *u*, to a projecting part of which is pivoted, at *v*, the rod *w*, the farther end of which is provided with an eye, *x*, through which is led the line *m*, secured to the harpoon. A small wooden pin, *y*, Fig. 3, passes through the projecting portion of the strap *u* into the rod *w*, so as to keep it in a proper direction for regulating the flight of the bomb-lance, this pin being broken when the bomb bursts, thus allowing the rod to swing around into a position similar to that indicated by the dotted lines in Fig. 3, where it serves as an additional means of fastening to the whale.

Instead of one rod, *w*, attached to the staff of the bomb, two rods may be used, if preferred.

Operation: The gun A and bomb-lance E having been properly charged, the latter, with its fuse *s*, is placed within the former, and the hammer *c* having been cocked and held in its firing position by the sliding rod *e*, the sleeve B is fitted over the apertures *b*, made in the breech, and the pin *h* removed, when the instrument is ready for use. On being thrown the harpoon D enters the whale until the button *j* on the rod *e* comes in contact with him, when it slides back in the guides *f g* and withdraws the end of the bent arm of the rod *e* from off the hammer *c*, thus releasing it and discharging the piece, when the bomb-lance is driven forcibly into the whale, the ignited fuse soon causing the bomb to burst with violence, thereby seriously injuring or killing the whale. The bomb-lance, being shattered by the discharge, becomes detached from the staff and the pin *y* broken, so as to allow the rod *w* to draw upon the staff, as shown in Fig. 3, and by this means the harpoon and lance will be fastened to the whale at one operation and effect his capture with a greater degree of certainty than has heretofore been attained.

Instead of a lance being used in connection with the bomb, a harpoon or other iron may be substituted therefor, it being screwed into or otherwise secured to the head of the bomb E.

If desired, the harpoon D may be moved from its socket *k* in the gun A, and only the bomb E with a lance or an iron of different form be employed.

It is evident that instead of the gun being provided with a lock, as above described, it may be discharged by a fuse leading up along the staff B, the fuse being ignited by the operator just before the instrument is thrown.

What I claim is—

1. A bomb-gun provided with a lock-case containing a hammer and its operating-spring, in combination with a sliding rod which has no connection with the hammer, except when the latter is in a cocked position, said sliding rod arranged in guides on the side of the gun and adapted to be connected with the hammer, for holding it in a cocked position and to release the same when shifted by impact against the body of the animal, substantially as and for the purpose specified.

2. A bomb-gun provided with a lock-case containing a hammer and its operating-spring, in combination with a bomb-lance and a sliding rod which has no connection with the hammer, except when the latter is in a cocked position, said sliding rod arranged in guides on the side of the gun and adapted to be connected with the hammer, for holding it in a cocked position and to release the same when shifted by impact against the body of the animal, substantially as and for the purpose specified.

3. A bomb-gun provided with a lock-case containing a hammer and operating-spring, in combination with a bomb-lance and a rod of greater length than the lance, said rod moving in guides on the side of the gun, and adapted to engage with the hammer, so as to hold the hammer in a cocked position and to release the same when shifted by impact against the body of the animal, substantially as described.

4. The combination, with a bomb-gun, of a socket for holding and supporting in working position a harpoon, a lock-case having a hammer and operating-spring, with a sliding rod arranged in guides on the side of the gun, for engaging with the hammer to hold it in a cocked position and to release it when shifted by impact against the body of the animal, substantially as described.

In testimony whereof I have hereunto set my hand in the presence of the subscribing witnesses.

EBEN. PIERCE.

Witnesses:

ALBERT H. NORRIS,
J. A. RUTHERFORD.